(12) United States Patent
Kim

(10) Patent No.: US 6,854,011 B2
(45) Date of Patent: Feb. 8, 2005

(54) SYSTEM AND METHOD FOR CONTROLLING TRAP GENERATION OF SIMPLE NETWORK MANAGEMENT PROTOCOL (SNMP) BY DEFINING AND USING A TRAPFLAG FIELD AND A TRAPPEER FIELD IN THE MANAGED INFORMATION BASE (MIB)

(75) Inventor: Chul Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 780 days.

(21) Appl. No.: 09/749,418

(22) Filed: Dec. 28, 2000

(65) Prior Publication Data

US 2001/0052010 A1 Dec. 13, 2001

(30) Foreign Application Priority Data

Dec. 29, 1999 (KR) ........................ 1999-64243

(51) Int. Cl.[7] ........................ G06F 15/173; G06F 15/16
(52) U.S. Cl. ........................ 709/224; 709/223; 709/230
(58) Field of Search ............... 709/223–224, 709/230, 236; 714/48–49, 54, 57; 707/10

(56) References Cited

U.S. PATENT DOCUMENTS

| | | | | |
|---|---|---|---|---|
| 5,471,617 A | * | 11/1995 | Farrand et al. ............. 718/100 |
| 5,651,006 A | * | 7/1997 | Fujino et al. ............... 370/408 |
| 5,655,081 A | * | 8/1997 | Bonnell et al. ............. 709/202 |
| 5,684,988 A | * | 11/1997 | Pitchaikani et al. ..... 707/104.1 |
| 6,006,016 A | * | 12/1999 | Faigon et al. ................. 714/48 |
| 6,009,431 A | * | 12/1999 | Anger et al. .................. 707/10 |
| 6,052,724 A | * | 4/2000 | Willie et al. ................ 709/223 |
| 6,167,403 A | * | 12/2000 | Whitmire et al. ............. 707/10 |
| 6,182,157 B1 | * | 1/2001 | Schlener et al. ............ 719/318 |
| 6,253,243 B1 | * | 6/2001 | Spencer ...................... 709/224 |
| RE37,987 E | * | 2/2003 | Yamunachari et al. ...... 709/224 |

OTHER PUBLICATIONS

Haggerty et al.; The benefits of COBRA–based network management; Oct. 1998; Communications of the ACM; vol. 41, No. 10; pp. 73–79.*

* cited by examiner

Primary Examiner—Rupal Dharia
Assistant Examiner—Quang N. Nguyen
(74) Attorney, Agent, or Firm—Fleshner & Kim, LLP

(57) ABSTRACT

A method for controlling trap generation of an SNMP which is operated between a manager and at least one agent, wherein a TrapFlag field and a Trap Peer field are defined for each management-object resource (each object) in describing an MIB of an SNMP and two or more objects are correlated to define a trap generation condition, so that trap generation can be effectively controlled by defining a trap behavior individually for an object of an SNMP MIB.

24 Claims, 3 Drawing Sheets

SYSTEM AND METHOD FOR CONTROLLING TRAP GENERATION OF SIMPLE NETWORK MANAGEMENT PROTOCOL (SNMP) BY DEFINING AND USING A TRAPFLAG FIELD AND A TRAPPEER FIELD IN THE MANAGED INFORMATION BASE (MIB)

BACKGROUND OF THE INVENTION

1. Field of the Invention

The present invention relates to an SNMP (Simple Network Management Protocol), and more particularly, to a method for controlling trap generation of an SNMP.

2. Description of the Background Art

One of network management protocols for a communication network management, the SNMP defines a control structure for a management-object resource (an object) on the basis of an RFC 1157 standard.

FIG. 1 shows a construction of a manager and an agent adopting an SNMP in accordance with a conventional art.

As shown in FIG. 1, the SNMP is adopted in the communication network consisting of a central SNMP management system (manager) 10 and at least one SNMP management-object system (agent) 12.

The manager 10 serves to control a management-object resource (object) of the agent 12 through the SNMP. That is, the manager 10 outputs an object access message (GET/SET/GETNEXT) to the agent 12 and performs searching, changing, generating or deleting on the object defined in an MIB (Managed Information Base) of the agent 12.

The GET message is a message to read a data from the MIB 14, and the SET message is a message to write a data in the MIB 14. The GETNEXT message is a message to read an object next to the object read by the GET message. A GETResponse is a message to transmit the data read from the MIB 14 to the manager 10 according to the GET/GETNEXT message.

Accordingly, when the manager 10 searches information, it transmits an OID (Object ID) together with the object access message (GET/GETNEXT) to the agent 12, and the agent 12 transmits the GETResponse message including a value of the corresponding data together with the OID back to the manager 10. In this respect, the OID is the ID of the object, and every data is discriminated by the OID.

The SNMP supports a 'Trap' operation so that the agent 12 voluntarily transmits information on the object to the manager 10, without depending on the request of the manager 10.

Describing a management object behavior, access authorization and grammar structure allowable for the object existing in the MIB 14, the SNMP defines a trap in the MIB 14 by relating an object to be subjected to trap generation to a condition of the trap generation. The trap is defined as follows:
ObjectName TRAP-TYPE
ENTERPRISE {enterprise name}
VARIABLES {variable name}
DESCRIPTION "comment"
::=Sub OID
Accordingly, when the state (i.e., system up/down and system disturbance) of the object is changed, the agent 12 voluntarily outputs a TRAP PDU (Protocol Data Unit) to inform the manager 10 of the state change of the object. In this respect, the TRAP PDU includes an OID and a corresponding data value.

The network management protocol through the SNMP will now be described in detail.

The manager 10 outputs an ID of the object (OID) together with the GET message to the agent 12 in order to search the state of the object of the agent 12. At this time, the OID is an ID of each object, by which every management-objected data is discriminated.

Upon receipt of the GET request, the agent 12 reads a data value from the MIB 14 and transmits the GETResponse message to the manager 10. The GETResponse message includes a pair of an OID and a read data (OID and a read data) form.

The manager 10 outputs the next OID together with the GETNEXT message in order to search the next object, and in response, the manager 12 transmits the GETResponse message in the same form to the MANAGER 10. This operation is repeatedly performed so as for the manager 10 to search the state of the every object.

When the manager 10 writes a data in the MIB 14, it outputs an OID of the object and a SET message, and the agent searches a target data by using the OID and changes a corresponding data value.

Meanwhile, unlike the GET/GETNEXT/SET message, the trap management behavior is used for the agent 12 voluntarily report the state of the object periodically. That is, after the agent 12 relates a specific data and a trap generation condition, when it comes to a predetermined cycle, the agent 12 outputs a trap PDU Protocol Data Unit) to inform the manger 10 of the change in the state of the object. Also, the TRAP PDU consists of a pair of an OID and a data, the same as that of the GETResponse message.

However, in the SNMP standard-based MIB technique of the conventional art, the object to be subjected to the trap generation is statically defined. Accordingly, conventionally, since the trap operation is adoptable only to the object defined in the MIB, the manager is not able to add or delete a specific object as an object as necessary during the network management operation.

In addition, once a trap condition is defined in the MIB, a trap operation is applied to every defined object, resulting in that the agent generates a TRAP PDU even for a object with little state change.

Thus, the agent generates a trap more than necessary and thus the manager should process numerous TRAP PDU transmitted from the plurality of agents, so that the traffic is increased. This works as a factor to degrade the management efficiency in the management network using the SNMP

SUMMARY OF THE INVENTION

Therefore, an object of the present invention is to provide a method for controlling trap generation which is capable of effectively controlling trap generation by defining a trap behavior individually for an object of an SNMP MIB.

To achieve these and other advantages and in accordance with the purpose of the present invention, as embodied and broadly described herein, there is provided a method for controlling trap generation of an SNMIP operated between a manager and at least one agent, wherein a TrapFlag field and a TrapPeer field are defined for each management-object resource (each object) in describing a MIB of an SNMP and two or more objects are correlated to define a trap generation condition.

To achieve the above object, there is provided a method for controlling trap generation of an SNMP which is operated between a manager and at least one agent, including the steps of: defining a TrapFlag field and a TrapPeer field in an MIB of an agent; setting a TrapFlag field value according to the message outputted from the manager; setting a TrapPeer field value for each object by the agent according to the Trap generation condition defined in the MIB; and generating a trap for an object according to the values of the TrapFlag field and the TrapPeer field.

To achieve the above object, there is provided a method for controlling trap generation of an SNMP including the steps of: defining a TrapFlag field and a TrapPeer field in an MIB of an agent; and generating a trap for an object according to the values of the TrapFlag field and the TrapPeer field as defined.

In the method for controlling trap generation of an SNMP, the step of generating a trap includes the sub-steps of: searching the TrapFlag field of each object when it comes to a trap generation period; checking a state of the TrapPeer field in case that the TrapFlag is in an 'ON' state; and generating a trap for a corresponding object in case that the TrapPeer is in an 'ON' state.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the present invention, when a trap object is described in an MIB of the SNMP, trap-related information is additionally defined for each object. The trap-related information is defined by adding the following fields in an MIB technique document.

1. TrapFlag Field

A TrapFlag field is a field representing whether a trap is to be generated or not for an object described in the MIB. The TrapFlag field is set to be turned on or off by the manager.

In case that the TrapFlag field is in an ON state, the agent generates a TRAP PDU for the corresponding object, while, in case that the TrapFlag field is in an OFF state, the agent does not generate a TRAP PDU for the corresponding object.

Accordingly, when an object of which state is little changed during a network management operation is generated, the TrapFlag field of the corresponding object is set to be "OFF" so that, even though a specific object is not deleted from the management target, the same effect can be obtained.

2. TrapPeer Field

A TrapPeer field is a field defining a trap generation condition for an object, which is set by 'ON' state (logic '1') or 'OFF' state (logic '0') by the agent. That is, in case that the state of an object satisfies a trap generation condition, the agent sets a TrapPeer field as the 'ON' state.

In this respect, the trap generation condition can be defined by correlating two or more objects. For example, when an object 'B' is greater than 'n' and an object 'C' is greater than 'm', a TrapPeer field is defined to be set as the 'ON' state. Consequently, without adding an object, the same effect can be obtained.

Accordingly, when the TrapFlag field and the TrapPeer field are all in the 'ON' state, the agent generates a TRAP PDU for the corresponding object.

Figure 1:
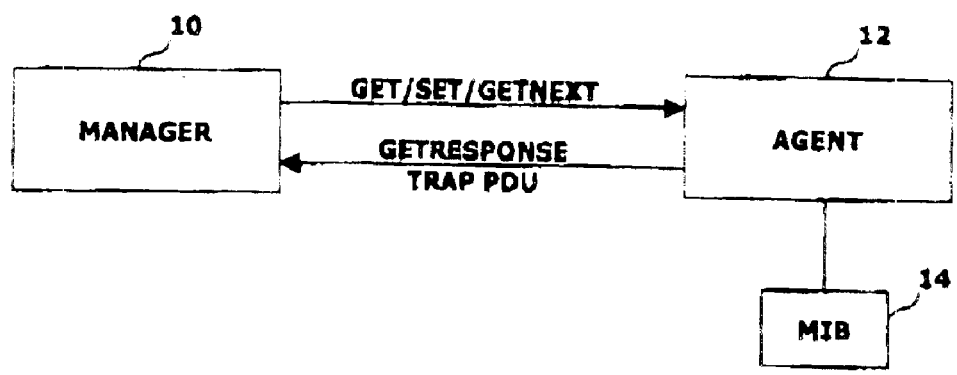
FIG. 1 shows a construction of a manager and an agent adopting an SNMP in accordance with a conventional art.
Figure 2:
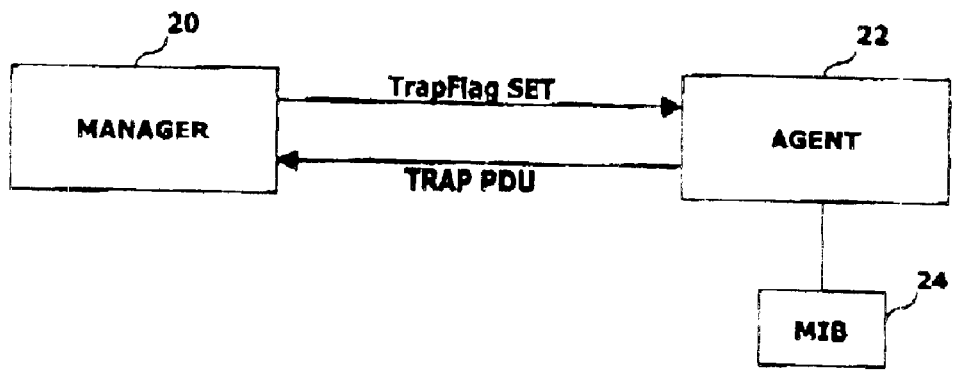
FIG. 2 shows a construction of a manager and an agent adopting an SNMP in accordance with the present invention.
Figure 3:
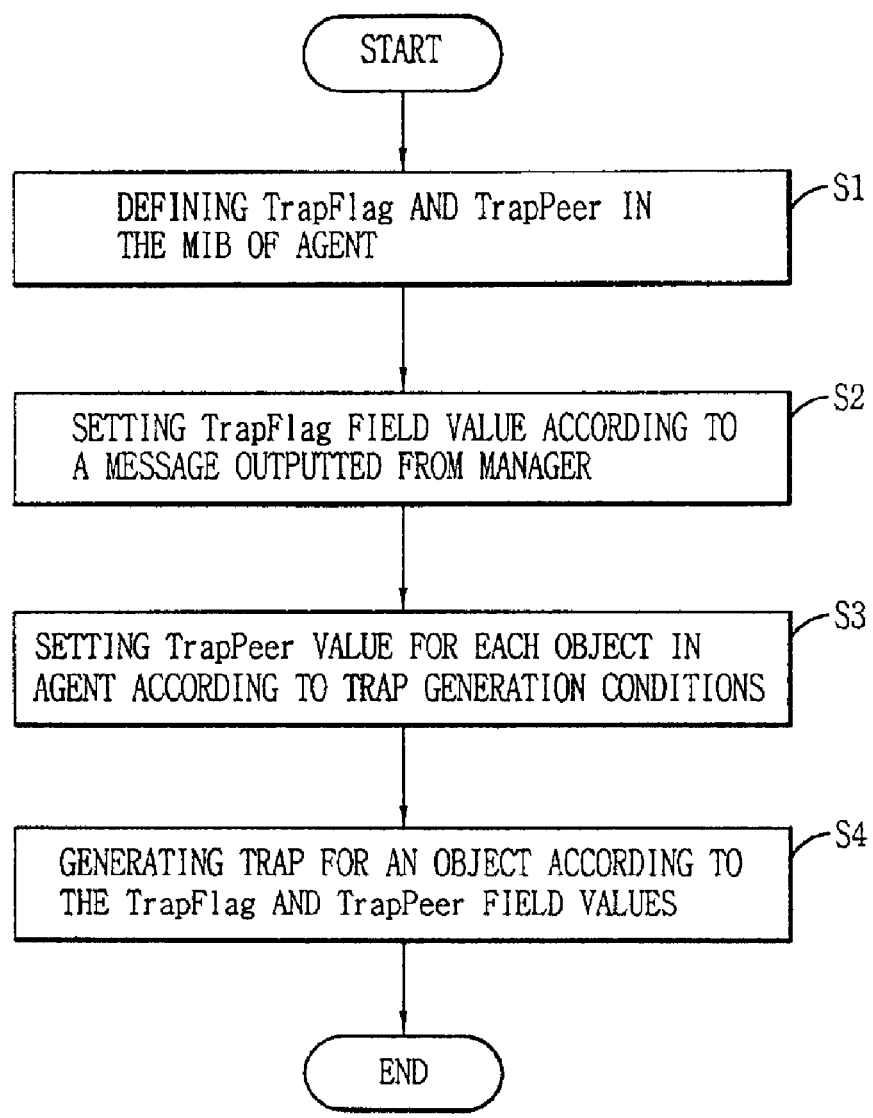
FIG. 3 is a flow chart of a method for controlling trap generation of the SNMP performed in the agent of FIG. 2 in accordance with the present invention.

As shown in FIG. 3, the manager 20 defines a trap as shown below by correlating objects, trap generation conditions, a TrapFlag field, and a TrapPeer field (S1).

ObjectName TRAP-TYPE
ENTERPRISE {enterprise name}
VARIABLES {variable name}
DESCRIPTION "comment"
TRAPFLAG {flag value}
TRAPPEER {flag value}
::=Sub OID For example, objects 'A' and 'B' are set and a trap generation condition can be defined as follows.

1) A value of the object 'A' is in the range of 1~5
2) If the value of the object 'A' is greater than '3', a TRAP PDU is basically generated.
3) If the value of the object 'B' is greater than 4, a value of the TrapPeer field of the object 'A' is set to be 'ON'.

And, the manager 20 outputs a TrapFlag setting signal to the agent 22 during network management to set a TrapFlag field value (S2). That is, the manager 20 sets a TrapFlag field of an object which shows little state change ordinarily as 'OFF' so as to count it out from an object list.

At this time, the process of the transmission of the object access message (GET/SET/GETNEXT) from the manager 20 to the agent 12 and the transmission of the GETresponse from the agent to the manager 20 is the same as in the conventional art, descriptions of which are thus omitted.

The agent 22 sets a value of the TrapPeer field of each object according to a trap generation condition as defined during network operation (S3).

Figure 4:
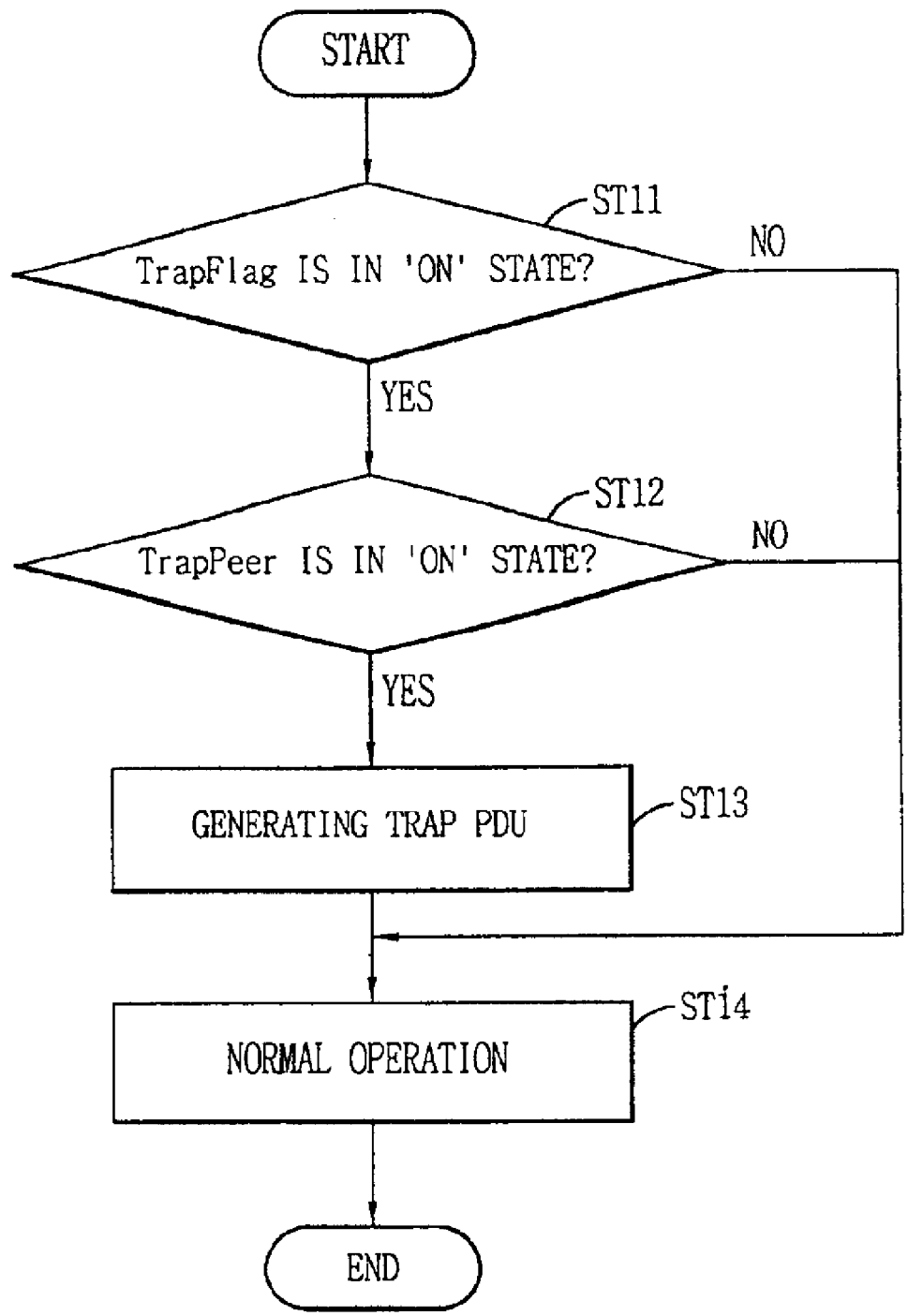
FIG. 4 is a detail flow chart of a method for generating a trap in the trap generating step S4 of FIG. 3 in accordance with the present invention.

Thereafter, when the report period comes, first, the agent 22 generates a trap for each object according to the values of the TrapFlag field and the TrapPeer field (S4). That is, as shown in FIG. 4, first, the agent 22 searches the TrapFlag field of the object 'A' to check whether a corresponding TrapFlag is in an 'ON' state (ST11).

If the TrapFlag of the corresponding object 'A' is in an 'OFF' state, even though the trap generation condition 2) is satisfied, the agent does not generate a trap. Meanwhile, in case that the TrapFlag is in an 'ON' state, it is checked whether the TrapPeer is in an 'ON' state (ST12). Upon checking, in case that the TrapPeer is in an 'ON' state, the agent 22 generates a trap for the object 'A' and performs a normal operation (ST13 and ST14).

In this manner, a trap is generated by conditions for two or more objects by using two fields. And, though a single agent is taken as an example for an explanation's sake in the present invention, a plurality of agents can be connected to the manager.

As so far described, according to the a method for controlling trap generation of an SNMP of the present invention, a TrapFlag field and a TrapPeer field are separately defined for each object in the MIB, and two or more objects are correlated to define trap generation conditions.

Accordingly, there is an effect that an object can be added or deleted as necessary, and especially, trap generation can be arbitrarily controlled.

In addition, the periodical management behavior does not performed for the object of which state is not changed, so that a traffic of the management behavior can be reduced.

Moreover, the agent is controlled and the state change is monitored by using the SNMP having the trap ON/OFF fields by objects, so that management efficiency in the management network can be increased.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for controlling trap generation of a SNMP (Simple Network Management Protocol) operated between a manager and at least one agent, comprising:
    defining in a MIB (Managed Information Base) a TrapFlag field and a TrapPeer field for each management-object resource and including at least two objects correlated together to define a trap generation condition,
    wherein a value of the TrapFlag field is set by the manager to indicate whether or not the agent should issue a Trap message for the corresponding object, and
    wherein a value of the TrapPeer field is set by the agent to indicate whether or not the trap generation condition is satisfied.

2. The method according to claim 1, wherein the value of the TrapFlag field is set in an 'ON' state or 'OFF' state by the manager.

3. The method according to claim 2, wherein the agent generates a trap for a corresponding object when the TrapFlag field is in the 'ON' state, and while the agent does not generate a trap when the TrapFlag field is in the 'OFF' state.

4. The method according to claim 1, wherein the TrapPeer field is set in an 'ON' state or an 'OFF' state by the agent.

5. The method according to claim 4, wherein the agent sets the TrapPeer field in the 'ON' state when a state of an object satisfies a trap generation condition.

6. A method for controlling trap generation of an SNMP (Simple Network Management Protocol) operated between a manager and at least one agent, comprising:
    defining a TrapFlag field and a TrapPeer field in a MIB (Managed Information Base) of an agent;
    setting a TrapFlag field value according to a message outputted from the manager;
    setting a TrapPeer field value for each object by the agent according to a Trap generation condition defined in the MIB; and
    generating a trap for an object according to the values of the TrapFlag field and the TrapPeer field.

7. The method according to claim 6, wherein the TrapFlag field is a field for indicating whether a trap is to be generated for each object described in the MIB.

8. The method according to claim 6, wherein the TrapPeer field is a field for defining a trap generation condition for an object.

9. The method according to claim 6, wherein the agent sets the TrapPeer field in the 'ON' state when the state of an object satisfies a trap generation condition.

10. The method according to claim 6, wherein the trap generation condition is defined by correlating at least two objects.

11. The method according to claim 6, wherein generating the trap comprises:
    searching the TrapFlag field of each object when it comes to a trap generation period;
    checking a state of the TrapPeer field when the TrapFlag is in an 'ON' state; and
    generating a trap for a corresponding object when the TrapPeer is in the 'ON' state.

12. The method according to claim 11, wherein when the TrapFlag is in the 'OFF' state, a trap is not generated.

13. The method according to claim 11, wherein when the TrapFlag is in the 'ON' state and the TrapPeer is in the 'OFF' state, a trap is not generated.

14. A method for controlling trap generation of an SNMP (Simple Network Management Protocol) comprising:
    defining a TrapFlag field and a TrapPeer field in a MIB (Managed Information Base) of an agent; and
    generating a trap for an object according to values of the defined TrapFlag field and the TrapPeer field,
    wherein generating the trap comprises:
    searching the TrapFlag field of each object when it comes to a trap generation period;
    checking a state of the TrapPeer field when the TrapFlag field is in an ON state; and
    generating a trap for a corresponding object when the TrapPeer field is in the ON state.

15. The method according to claim 14, wherein the TrapFlag field is a field for indicating whether a trap is to be generated for each object described in the MIB.

16. The method according to claim 14, wherein the TrapPeer field is a field for defining a trap generation condition for an object.

17. The method according to claim 14, further comprising:
    setting the TrapFlag field value according to a message outputted from the manager; and
    setting the TrapPeer field value for each object in the agent according to trap generation conditions defined in the MIB.

18. The method according to claim 17, wherein the manager outputs a message to set the TrapFlag field of an object of which state is not changed in an 'OFF' state.

19. The method according claim 17, wherein the trap generation condition is defined by correlating at least two objects.

20. The method according to claim 17, wherein the agent sets the TrapPeer field in the 'ON' state when the state of an object satisfies a trap generation condition.

21. A SNMP (Simple Network Management Protocol) management system, comprising:
    a MIB (Managed Information Base) including definitions for a TrapFlag field and a TrapPeer field for each management-object resource to define a trap generation condition;
    an agent configured to set a value of the TrapPeer field to indicate whether or not the trap operation condition is satisfied; and
    a manager connected to the agent and configured to set a value of the TrapFlag field to indicate whether or not the agent should issue a Trap message for the corresponding object when the trap condition is satisfied.

22. The system of claim 21, wherein the generation condition includes at least two objects correlated together and which must be met to satisfy the trap generation condition.

23. The system according to claim 21, wherein the agent generates a trap for a corresponding object when the TrapFlag field is in the 'ON' state, and the agent does not generate a trap when the TrapFlag field is in the 'OFF' state.

24. The system according to claim 21, the agent sets the TrapPeer field is an 'ON' state when a state of an object satisfies the trap generation condition.

* * * * *